Patented Apr. 9, 1946

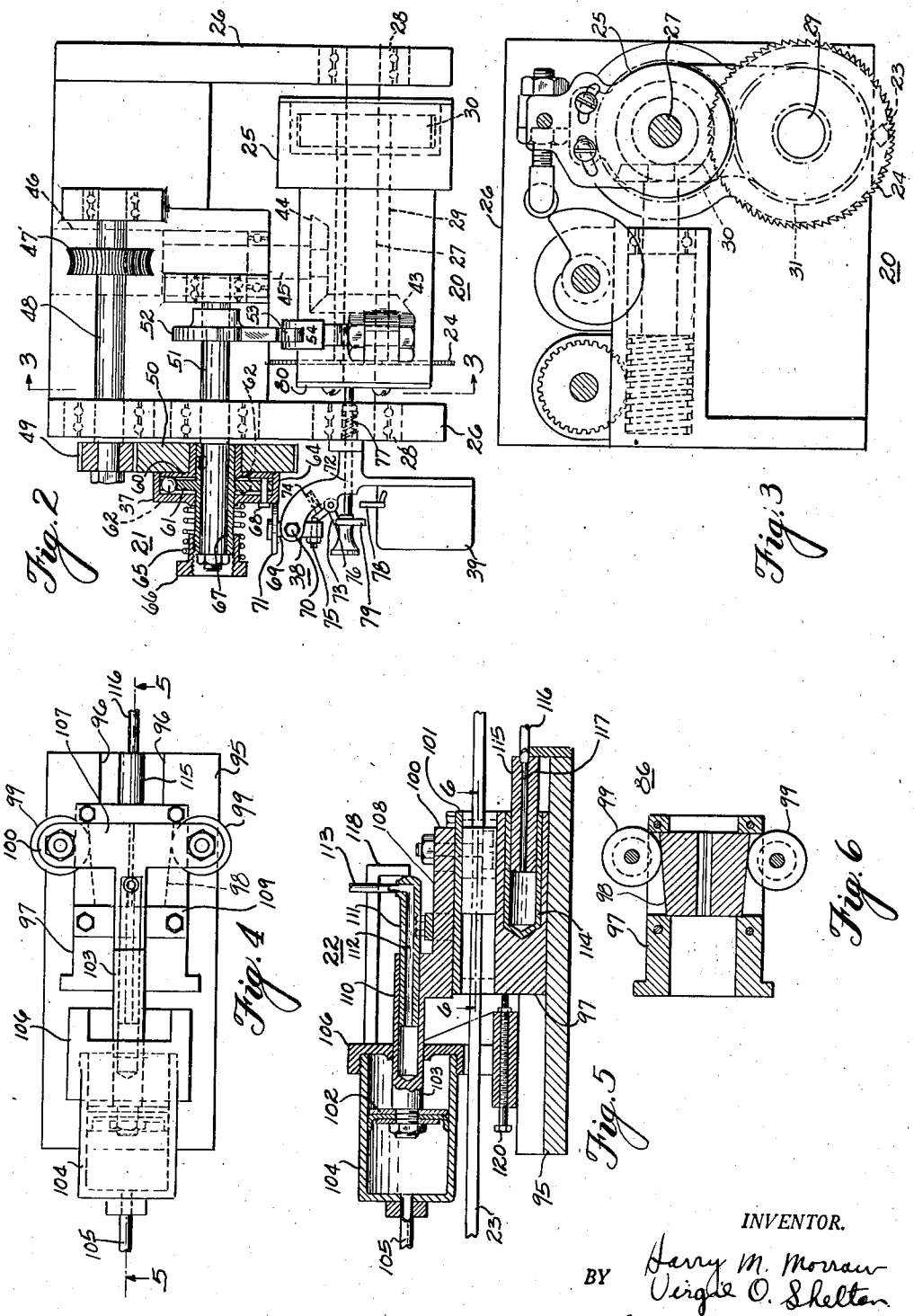

2,397,974

UNITED STATES PATENT OFFICE 2,397,974

CUTTING MACHINE

Harry M. Morrow and Virgil O. Shelton, Canton, Ohio, assignors to The Bowdil Company, a corporation of Ohio Application September 15, 1943, Serial No. 502,416

23 Claims. (Cl. 29—69)

Our invention relates to a cutting machine for cutting a stock of material into shorter pieces and more particularly to the combination of the cutting tool feeding mechanism and the stock injection mechanism.

Our invention will be described in connection with a cutting saw for cutting a stock of material into shorter pieces, but it is to be understood that our invention applies to cutting tools other than a cutting saw.

An object of our invention is the provision of feeding a cutting tool to the stock of material which is to be cut into shorter pieces, and in the event that the pressure which the tool presses against the stock reaches a predetermined value incident to the cutting tool becoming dull or for any other reason, the feeding mechanism which feeds the cutting tool to the stock then becomes intermittent until the stock is cut in two, at which time the entire feeding mechanism is arrested or stopped.

Another object of our invention is the provision of intermittently feeding the cutting tool to the stock in the event that the cutting tool becomes dull, the intermittent cutting operation continuing until the stock is completely cut in two.

Another object of our invention is the provision of a releasable clutch which feeds the cutting tool to the stock material which is to be cut into shorter pieces, in which the releasable clutch is arranged to intermittently feed the cutting tool to the stock in the event that the pressure which the tool is applied to the stock exceeds a predetermined high value, the intermittent feeding operation of the clutch continuing until the stock is completely cut in two, at which time a tripping mechanism arrests the complete cutting operation of the cutting machine.

Another object of our invention is the provision of arresting the cutting operation when the cutting tool becomes dull.

Another object of our invention is the provision of a completely automatic cutting machine in which the stock material which is to be cut in shorter pieces is automatically injected in cutting position and in which the cutting operation is performed in time sequence with the injection operation.

Another object of our invention is the provision of injecting the stock of material into cutting position in accordance with the position or movement of the cutting tool.

Another object of our invention is the provision of injecting the stock of material a predetermined equal distance for each of the injection operations.

Another object of our invention is the provision of a stock injection mechanism having a first clamping device and a second clamping device, the first clamping device delivering the stock to the tool and the second clamping device holding the stock stationary after it is delivered to the tool.

Another object of our invention is the provision of causing the second clamping device to hold the stock stationary during the cutting operation of the tool and causing the first clamping device upon the finishing of the cutting operation to firmly grip the stock and push same while still being held stationary by the second clamping device, the second clamping device subsequently releasing the stock and permitting the first clamping device to inject the stock into cutting position for the cutting tool, after which the second clamping device re-clamps the stock for another cutting operation during which time the first clamping device is retracted to regain another grip upon the stock for a subsequent rejection.

Another object of our invention is the provision of causing the first clamping device to deliver the stock a predetermined distance for each rejection of the stock into cutting position for the cutting tools.

Other objects and a fuller understanding of our invention may be had by referring to the following description and claims, taken in conjunction with the accompanying drawings, in which:

Figure 2 is a plan view of the tool feeding mechanism assembly and the cutting tool portion of the machine, the hydraulic stock injector being not shown;

Figure 3 is a cross-sectional view taken along the line 3—3 of Figure 2 and showing principally the cutting saw and the pendulum frame which feeds the saw into cutting operation with the stock to be cut into shorter pieces;

Figure 4 is a plan view of the injector clamping device for delivering the stock to the cutting tool;

Figure 5 is a cross-sectional view taken along the line 5—5 of Figure 4;

Figure 6 is a cross-sectional view taken along the line 6—6 of Figure 5 with certain of the parts omitted;

Figure 1:
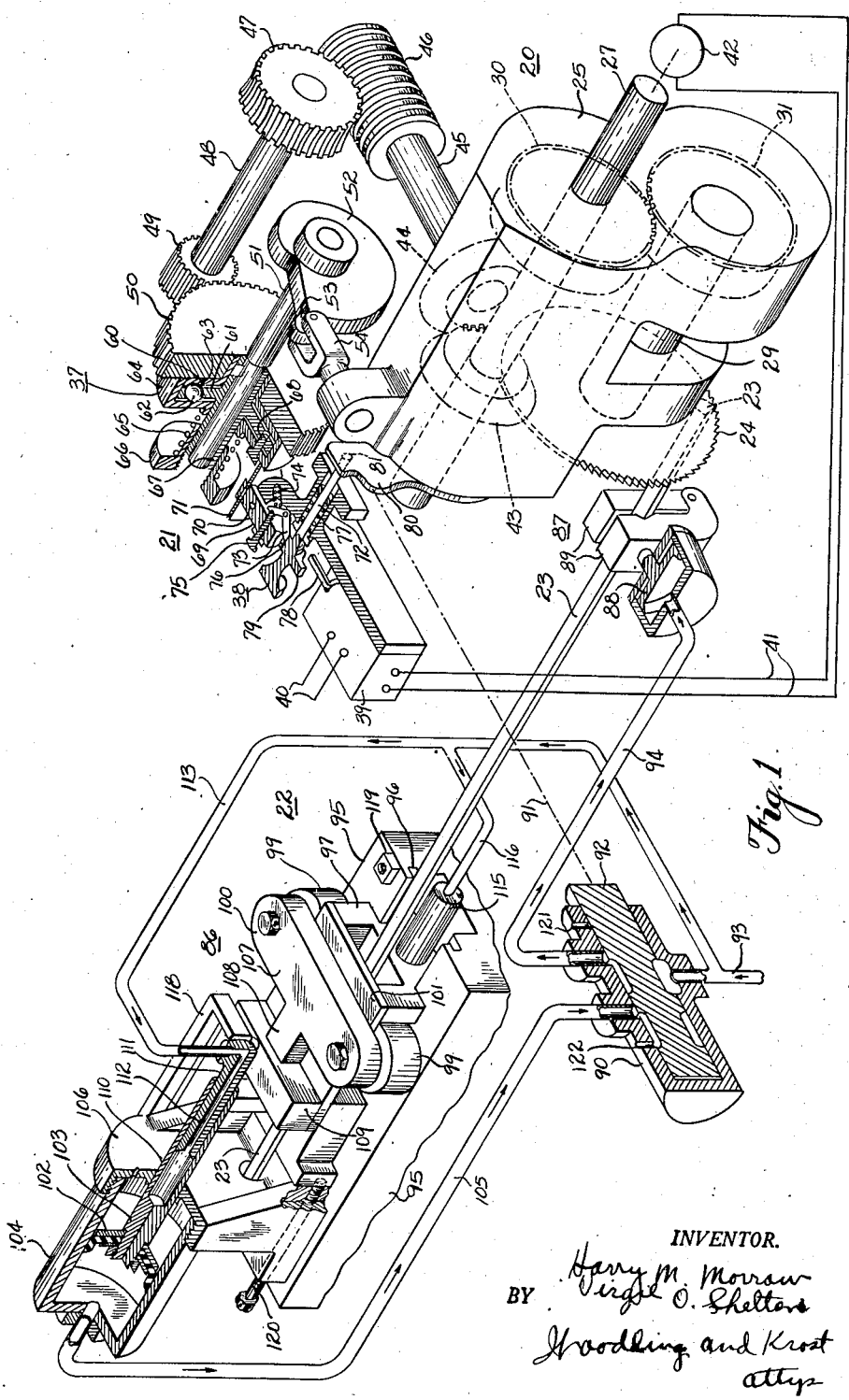
Figure 1 is a somewhat diagrammatic and perspective view of our cutting machine showing the complete assembly including the clutch driven tool feeding mechanism and the hydraulic stock injector for injecting the stock to the cutting tool.

With reference to Figure 1, our invention comprises generally a cutting tool pendulum mechanism indicated generally by the reference character 20, a tool feeding and tripping mechanism indicated by the reference character 21, and a work injector mechanism indicated generally by the reference character 22. The stock of material which is to be cut in shorter pieces is indicated generally by the reference character 23 and is arranged to be injected at predetermined equal distances for each injection into cutting operation for the cutting tool which, in the illustration, is represented as a saw 24, although it is to be understood that my invention applies to other type of cutting tools. The saw 24 is carried by a pendulum frame 25 which swings about a main drive shaft 27 which is driven by an electric motor 42. As shown in Figure 2, the main drive shaft 27 is supported by two side frames 26 which carry bearings 28 in which the main drive shaft turns. As illustrated in Figure 1, the pendulum frame 25 carries a second drive shaft 29 which drives the saw 24. The second drive shaft 29 is driven by means of the gears 30 and 31. As the pendulum frame 25 is moved the saw is likewise moved relative to the bar stock 23 which is to be cut into shorter pieces. Inasmuch as the pendulum frame 25 swings about the main drive shaft 27, the two gears 30 and 31 always maintain their driving engagement for turning the second drive shaft 29 and the tool.

The pendulum frame 25 is moved by means of a cam 52 and a roller 53 which rides thereon and which actuates an actuator 54 which is connected to the uppermost portion of the pendulum frame. The clutch 37 operates a tripping mechanism indicated by the reference character 38 which when the pendulum frame 25 is returned to its initial starting position, operates a switch 39 which disconnects the motor 42 and the control conductors 41 from the supply conductors 40 to stop the cutting operation. In ordinary cutting operation the clutch is so set that no tripping operation will occur. However, in the event that the saw becomes dull and greater pressure is required to force the saw into the bar stock, then the torque imposed upon the clutch trips the tripping mechanism to convert a steady cutting operation into an intermittent cutting operation, which intermittent cutting operation continues until the bar stock is completely cut off, whereupon the pendulum frame 25 is returned to its initial starting position which permits the tripping mechanism 38 to operate the switch 39 for stopping the motor 42.

As shown in Figures 1 and 3, when the roller 53 rides upon the high part of the cam 52 the saw is brought into cutting engagement with the stock of material. The cam 52 is driven from the main drive shaft 27 through a mechanical transmitting arrangement which comprises the following parts: beginning with the main drive shaft 27, through a pair of bevel gears 43 and 44, a shaft 45, a pair of gears 46 and 47, a shaft 48, and a gear 49 to the gear 50 of the clutch 37. From the gear 50, power is transmitted to a clutch driven plate 60 and thence to a clutch drive plate 61 through means of balls 62 which are arranged to partially fit into sockets 63 provided in the clutch driven plate 60. The clutch drive plate 61 is keyed to the shaft 51 which drives the cam 52. Any number of balls 62 may be used and in Figure 2 I show three such balls spaced approximately 120° apart. The balls 62 are constrained to seat in their sockets 63 by means of a housing 64 which urges the balls in their sockets under the action of a spring 65 which is interposed between the housing 64 and an adjusting knob 66 by which the tension of the spring may be varied. The greater the spring tension of the spring 65 the more the torque that the clutch will transmit before the balls are constrained out of their sockets 63. The adjusting knob 66 is threadably connected to the outside of a hollow shaft extension 67 through which the shaft 51 extends and is connected to the clutch drive plate 61. The housing 64 which constrains the balls 62 in their sockets 63 rotates with the clutch drive plate 61 as it is keyed thereto by means of the locking pin 68.

In operation of the clutch 37, in the event that the cutting saw 24 becomes dull, in which case the pressure between the cutting saw and the bar stock is increased, the clutch at a predetermined pressure value will release upon the balls 62 being constrained out of their sockets 63. The balls will continue to slide around against the face of the clutch drive plate 61 until they again fall into the next succeeding sockets, at which time the saw is again driven into cutting engagement with the bar stock and will continue to cut until the pressure between the saw and the stock is again raised to a high value at which time the balls are constrained to be moved out of their sockets whereupon the driving force of the clutch is again released to relieve the pressure between the cutting tool and the bar stock. In operation, the tension of the spring 65 is such that the balls normally do not slide or slip out of their sockets unless the tool becomes dull or for any other reason the tool may not be working properly. In the event the tool becomes dull and should be changed, the intermittent cutting operation continues until the bar stock is cut off at which time the motor 42 is de-energized for arresting the entire cutting operation. The stopping of the motor 42 is accomplished by means of a tripping mechanism which is governed by the axial displacement of the clutch drive plate 61 with respect to the clutch driven plate 60 upon the balls slipping or sliding out of their sockets 63. As the balls slide or slip out of their sockets 63, they push the housing 64 against the spring 65. The outward movement of the housing 64 trips a latch mechanism which comprises a pivoted lever 69 having a pivot point 70 upon one end of which pivot lever is a wheel 71 that engages the outer surface of the housing 64 of the clutch. The opposite end of the pivoted lever 69 carries an adjusting screw 75 which engages a latch lever 73 which engages a shoulder 76 upon a switch actuating plunger 72. A spring 74 is arranged to constrain the latch lever 73 under the shoulder 76 so that under normal operation the switch actuating plunger 72 is held in the position shown in Figures 1 and 2. The latch lever 73 is somewhat L-shaped so that as the housing 64 of the clutch moves outwardly, the adjusting screw 75 moves inwardly and actuates the latch lever 73 such that the end which fits under the shoulder 76 is moved out from under the shoulder which releases the switch actuating plunger 72. As the end of the latch lever 73 is moved away from underneath the shoulder 76 the switch actuating plunger 72 is constrained to move inwardly under the tension of a spring 77 which surrounds the switch actuating plunger 72. However, the switch actuating plunger 72 cannot move inwardly because the end 81 thereof is arranged to engage an arresting plate 80 which prevents the switch actuating plunger 72 from being moved inwardly under the action of the spring 77. The switch actuating plunger 72 is provided with a boss 79 which when it moves inwardly engages a switch lever 78 upon the switch 39 which governs the operation of the motor 42 through the control conductors 41. The arresting plate 80 is arranged such that the switch actuating plunger 72 cannot be moved inwardly and operate the switch 39 to stop the motor 42 so long as the cutting saw has not as yet completely cut the bar stock off. However, just as soon as the saw has cut the bar stock off and the pendulum mechanism moves back to its initial starting position, the arresting plate 80 clears the end 81 of the switch actuating plunger and permits the spring 77 to constrain the switch actuating plunger 72 inwardly, during which movement the boss 79 engages the switch lever 78 and interrupts the circuit for stopping the motor 42.

In operation, the clutch is so set by the adjusting knob 66 that the clutch does not become disengaged under the normal cutting torque of the saw. However, in the event that the saw becomes dull and should be resharpened or otherwise replaced by a new saw, the balls 62 slide or slip out of their sockets and trip the latch lever 73 for releasing the switch actuating plunger 72. Inasmuch as the end 81 of the switch actuating plunger cannot move completely inwardly since it is resting upon the arresting plate 80, the motor continues to run and drive the saw under the intermittent operation of the clutch. During the intermittent operation of the clutch the balls slide upon the outer face of the clutch drive plate 61 until they engage the next set of sockets, at which time the tool is intermittently pressed against the stock for another short interval of cutting until the pressure of the tool against the stock attains a predetermined value and then the clutch balls are released again to give a breathing spell for the cutting tool, after which when the balls re-engage the next set of sockets the cutting tool is then brought into cutting engagement with the bar stock. This intermittent type of cutting continues until the bar stock is completely cut off, after which time the motor 42 is stopped. When the bar stock is completely cut off, the roller 53 then falls back within the dwell of the cam and the interaction between the driving gears 30 and 31 is such as to rotate the pendulum to its initial starting position to clear the bar stock so that the bar stock may be again re-injected into cutting position for the saw. After the bar stock is re-injected into cutting position the cam is then rotated by the clutch whereby the roller 53 riding upon the cam urges the pendulum in such a direction as to feed the saw into cutting engagement with the bar stock.

The work injector mechanism 22 comprises a first injecting clamping device 86 and a second holding clamping device 87. The injecting clamping device 86 is arranged to inject the stock into cutting position for the cutting tool a predetermined definite length upon each injection and the holding clamping device 87 is arranged to hold the bar stock in a stationary position during the cutting operation of the saw 24. The holding clamping device 87 comprises a fluid piston device 88 which is arranged to operate jaws 89 for holding the bar stock in a steady position during the cutting operation. The fluid piston device 88 is governed by a control valve 90 through which fluid from the supply line 93 flows to a feed line 94 for actuating the fluid piston device 88. The plunger 92 of the control valve is actuated in accordance with the movements of the pendulum frame 25 through a motion transmitting means indicated by the dash-dot line 91.

The injecting clamping device 86 is supported by a stationary bed plate 95 having guide ways 96 into which a slidable block 97 reciprocates upon each injection of the bar stock to the saw. Mounted within the slidable block 97 are two laterally movable jaws 98 which are actuated inwardly by spaced rollers 99 carried by the crosshead 107 of a T-shaped arm 100. The outside edges of the movable jaws 98 diverge outwardly in the direction of the movement of the stock so that as the rollers are pushed by the feed piston 102 the stock is fed into cutting position for the saw. The T-shaped arm 100 is arranged to rest upon the top of a plate 101 and is connected to a piston rod 103 which is connected to the piston 102 that reciprocates within the cylinder 104. Fluid under pressure is delivered to the cylinder chamber 104 through a feed line 105 which is connected to the control valve 90. When fluid under pressure is admitted to the cylinder chamber 104, the piston 102 therein actuates the rollers 99 for injecting the stock in cutting position for the saw. When the pressure within the fluid cylinder 104 is released the piston 102 is returned to its initial starting position by means of a stationary piston 111 fitting within a cylinder 110 provided in the piston rod 103. The outer end of the stationary piston 111 is anchored to the bracket 106 that supports the main cylinder 104 by means of an extended stationary bracket 118. Fluid under pressure is continuously applied to the cylinder 110 through a fluid passage 112 within the stationary piston 111 and a pipe 113 which is connected to the feed line 93. The force exerted by the stationary piston 111 within the cylinder 110 is ample to force the large piston 102 to its initial starting position within the large cylinder 104 when the pressure within the large cylinder chamber is admitted to atmosphere. However, when fluid under pressure is applied to the large cylinder chamber 104 it is sufficiently large to overcome the opposing force of the small piston 111 so that the piston 102 actuates the T-shaped arm 100 for urging the rollers against the diverging side of the laterally movable jaw members 98 for actuating the rod 23. The rearwardly extending arm 108 of the T-shaped arm 100 is arranged to fit in a guide-way provided in the plate 109 which is anchored to the slidable block 97 on top of the plate 101. The slidable block 97 is continuously urged in a direction opposite to the movement of the stock so as to keep the diverging sides of the jaws 98 against the rollers 99. As shown best in Figure 5, this opposing urging force is accomplished by means of a cylinder 114 having a stationary piston 115 mounted therein. Fluid from the supply line 93 is conveyed to the cylinder 114 through a fluid line 116 and a fluid passage 117 within the stationary piston 115. The outer end of the stationary piston 115 is anchored to the stationary bed plate 95. The object of the cylinder 114 and the stationary piston 115 is to keep the diverging sides of the jaws constantly against the rollers 99 so as to avoid any possibility of slack between the rollers and the sides of the jaws. Thus, during the retracting movement of the jaws, the jaws are caused to produce a certain amount of drag upon the bar stock dependent upon the pressure within the small opposing cylinder 114. In actual operation, this opposing force is such that a steady drag is placed upon the bar stock during the return movement of the jaws so that when the jaws reach the end of the return movement and are again pushed forwardly by the large piston 102 there is no slipping of the jaws with respect to the bar stock. In other words, the bar stock is immediately gripped by the moving jaws so that upon each injection of the bar the distance is always the same as determined by the setting of the reciprocal movement of the T-shaped arm 100. The movement in a forward or feeding direction of the T-shaped arm 100 or the slidable block 97 is governed by an adjustable stop 119 which is adjustably anchored to the stationary bed plate 95. The return movement of the slidable block 97 is governed by an adjusting screw 120 which extends through the face of the stationary bracket 106 and which engages the rearwardmost end of the slidable block 97.

Figure 7:
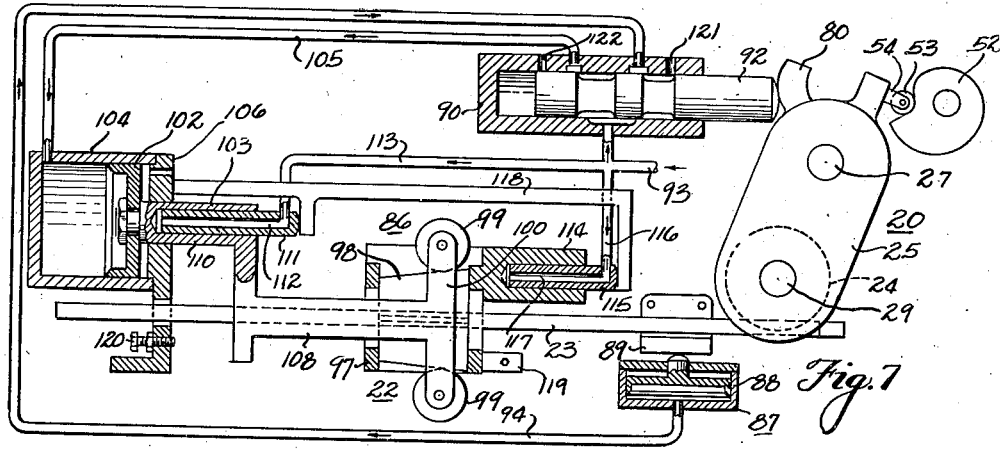
Figure 7 is a diagrammatic view illustrating the sequence of movement between the tool feeding movement and the hydraulic injector mechanism for injecting the stock to the cutting tool.
Figure 8:
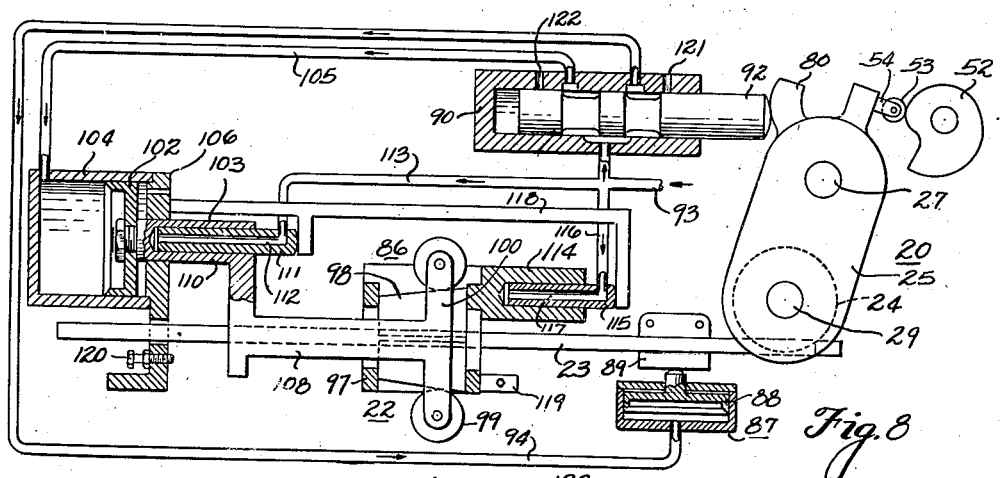
Figure 8 is a view similar to Figure 7, but shows the parts in another position than that shown in Figure 7.
Figure 9:
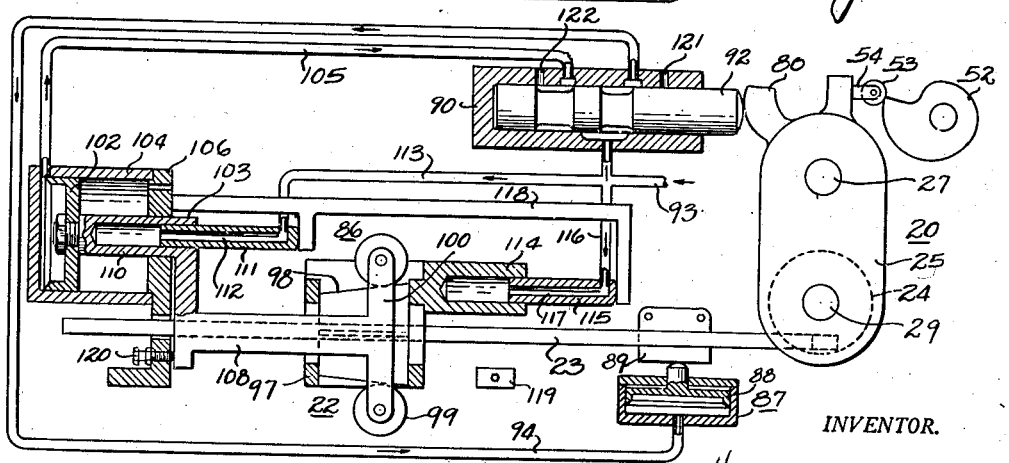
Figure 9 is a view similar to Figures 7 and 8 but shows the parts in a still different view than that shown in Figures 7 and 8.

In Figures 7, 8 and 9, we show three different positions of the work injector mechanism which is governed in accordance with the position of the pendulum frame which feeds the cutting saw to the bar stock which is to be cut. The Figure 7 may be referred to as the injector feed stroke and shows the jaws 89 of the holding clamping device 87 released, and the injecting clamping device 86 has actuated the bar stock 23 to the full end of its stroke where the slidable block 97 is resting against the adjustable stop 119. In this position, fluid under pressure is admitted by the valve 90 to the large cylinder chamber 104 and the fluid within the fluid piston device 88 which actuates the holding clamping device 87 is vented to atmosphere through the valve 90 which has an exhaust port 121. The work injection stroke takes place when the roller 53 which actuates the pendulum frame 25 is resting within the dwell of the cam 52 and is the position where the saw is in its initial starting feeding position.

The position shown in Figure 8 is the beginning of the saw cut and in passing from the position shown in Figure 7 to the position shown in Figure 8 the plunger within the control valve 90 has been actuated to the point that the fluid piston device 88 now constrains the jaws 89 against the bar stock to hold the bar stock rigidly while the sawing operation is being performed. In passing from the position 8 to the position 9, the plunger 92 is actuated such that the pressure within the large cylinder chamber 104 is admitted to atmosphere through the control valve by means of an exhaust port 122 and the injecting clamping device 86 is returned to the beginning of its initial starting stroke. The jaws 89 of the holding clamping device 87 are still engaging the bar stock. The position shown in Figure 9 shows the bar stock completely cut off and the roller 53 is about ready to fall in the lowermost dwell of the cam 52, during which time the pendulum frame 25 is returned to its initial starting position. During the interval of time that the roller 53 falls into the lowermost position of the dwell, the plunger 92 of the control valve 90 passes through a transitional period such that the fluid pressure is applied to the large cylinder chamber 104 prior to the time that fluid under pressure within the fluid piston device 88 is vented to atmosphere through the exhaust port 121, which means that the injecting clamping device 86 is firmly gripping the bar stock and pushing same while the bar stock is still being held stationary by the fluid piston device 88 constraining the jaws 89 against the bar stock. The complete cycle of operation of my work injector mechanism may be described or summarized as follows: the holding clamping device 87 holds the bar stock stationary during the cutting operation of the saw and the injecting clamping device 86 upon the finishing of the cutting operation is firmly gripping the stock and pushing same while still being held stationary by the holding clamping device 87, which is subsequently released and permitting the injecting clamping device 86 to inject the stock into cutting position for the cutting tool, after which the holding clamping device reclamps the stock for another cutting operation during which time the injecting clamping device is retracted to regain another grip upon the stock for a subsequent operation.

In actual operation, we find that our cutting machine is able to cut bar stock off into short pieces which do not vary in length as much as as few thousandths of an inch. This is all accomplished without the bar stock itself engaging any stop, by having the end thereof, for example, abut against a stop which would interfere with the cutting operation of the saw. The accuracy in the feed stroke appears to reside in the fact that there is no slack or clearance between the rollers 99 and the engaging surfaces of the movable jaws 98. The entire cutting arrangement is automatic in that when once a long bar is mounted within the injecting mechanism and the saw once started in operation, the cutting is performed without any more attention given to it by the operator. In the event that the saw becomes dull and should be resharpened or replaced by another saw, then the clutch will intermittently feed the saw to the bar until the bar is completely sawed off after which when the pendulum frame returns to its initial feeding position, the motor 42 is stopped at which time the operator replaces the dull saw with a new saw after which the operation may be again started and continued without attention.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. A cutting machine for cutting a stock of material into shorter pieces comprising, in combination, a main drive shaft, an electric motor for driving the main drive shaft, switch means for controlling the operation of the motor, a pendulum frame pivotally swingable about the main drive shaft, a second shaft carried by the pendulum frame, means for driving the second shaft by the main drive shaft, a cutting tool driven by the second shaft for cutting the stock of material, cam means for actuating the pendulum frame for moving the cutting tool relative to the stock of material, mechanical transmitting means for driving the cam means from the main driving shaft, said mechanical transmitting means including a clutch having axially separating disengaging parts, a switch actuating member, spring means for urging the switch actuating member to travel in one direction to open the switch and de-energize the electric motor, latch means to oppose the travel of the switch actuating member, tripping means responsive to the axial movement of the separating clutch parts to trip the latch means, whereby the switch actuating member travels in said one direction under the action of the spring means, arresting means movable with the pendulum frame for arresting the travel of the switch actuating member and thereby delaying the opening of the switch means, said switch actuating member continuing its travel and opening the switch means when the arresting means clears the switch actuating member.

2. A cutting machine for cutting a stock of material into shorter pieces comprising, in combination, a main drive shaft, an electric motor for driving the main drive shaft, switch means for controlling the operation of the motor, a pendulum frame pivotally swingable about the main drive shaft, a second shaft carried by the pendulum frame, means for driving the second shaft by the main drive shaft, a cutting tool driven by the second shaft for cutting the stock of material, cam means for actuating the pendulum frame for moving the cutting tool relative to the stock of material, mechanical transmitting means for driving the cam means from the main driving shaft, said mechanical transmitting means including a clutch having axially separating disengaging parts, a switch actuating member, spring means for urging the switch actuating member to travel in one direction to open the switch and de-energize the electric motor, latch means to oppose the travel of the switch actuating member, tripping means responsive to the axial movement of the separating clutch parts to trip the latch means, whereby the switch actuating member travels in said one direction under the action of the spring means to open the switch means.

3. A cutting machine for cutting a stock of material into shorter pieces comprising, in combination, a main drive shaft, an electric motor for driving the main drive shaft, switch means for controlling the operation of the motor, a pendulum frame pivotally swingable about the main drive shaft, a second shaft carried by the pendulum frame, means for driving the second shaft by the main drive shaft, a cutting tool driven by the second shaft for cutting the stock of material, cam means for actuating the pendulum frame for moving the cutting tool relative to the stock of material, mechanical transmitting means for driving the cam means from the main driving shaft, said mechanical transmitting means including a clutch having axially separating disengaging parts, and control means responsive to the axial movement of the separating clutch parts to open the switch means and de-energize the electric motor.

4. A cutting machine for cutting stock of material into shorter pieces comprising, in combination, a main drive shaft, an electric motor for driving the main drive shaft, switch means for controlling the operation of the motor, a pendulum frame pivotally swingable about the main drive shaft, a second shaft carried by the pendulum frame, means for driving the second shaft by the main drive shaft, a cutting tool driven by the second shaft for cutting the stock of material, cam means or actuating the pendulum frame for moving the cutting tool relative to the stock of material, mechanical transmitting means for driving the cam means from the main driving shaft, said mechanical transmitting means including a clutch having axially separating disengaging parts, control means responsive to the axial movement of the separating clutch parts to open the switch means and de-energize the electric motor, and means to delay the opening of the switch means until the pendulum frame reaches a predetermined position.

5. A cutting machine for cutting a stock of material into shorter pieces, comprising in combination, a main shaft, a pendulum frame pivotally swingable about the main drive shaft, a second shaft carried by the pendulum frame, driving means for driving the second shaft, a cutting tool driven by the second shaft for cutting the stock of material, mechanical transmitting means driven by the driving means for actuating the pendulum frame to move the cutting tool relative to the stock of material, said mechanical transmitting means including a clutch having axially separating disengaging parts, and tripping means responsive to the axial movement of the separating clutch parts to arrest the driving means.

6. A cutting machine for cutting a stock of material into shorter pieces, comprising in combination, a main shaft, a pendulum frame pivotally swingable about the main drive shaft, a second shaft carried by the pendulum frame, driving means for driving the second shaft, a cutting tool driven by the second shaft for cutting the stock of material, mechanical transmitting means driven by the driving means for actuating the pendulum frame to move the cutting tool relative to the stock material, said mechanical transmitting means including a clutch having axially separating disengaging parts, tripping means responsive to the axial movement of the separating clutch parts to arrest the driving means, and means to delay the arresting of the driving means until the pendulum frame reaches a predetermined position.

7. A cutting machine for cutting a stock of material into shorter pieces, comprising, in combination, a cutting tool, an electric motor for driving the cutting tool, switch means for controlling the operation of the motor, mechanical transmitting means driven by the motor for feeding the cutting tool relative to the stock of material, said mechanical transmitting means including a clutch having axially separating disengaging parts, a switch actuating member, spring means for the switch actuating member to travel in one direction to open the switch and de-energize the electric motor, latch means to oppose the travel of the switch actuating member, tripping means responsive to the axial movement of the separating clutch parts to trip the latch means, whereby the switch actuating member travels in said one direction under the action of the spring means, arresting means movable with the feed of the tool for arresting the travel of the switch actuating member and thereby delaying the opening of the switch means, said switch member continuing its travel and opening the switch means when the feed of the tool reaches a predetermined position.

8. A cutting machine for cutting a stock of material into shorter pieces, comprising, in combination, a cutting tool, an electric motor for driving the cutting tool, switch means for controlling the operation of the motor, mechanical transmitting means driven by the motor for feeding the cutting tool relative to the stock of material, said mechanical transmitting means including a clutch having axially separating disengaging parts, a switch actuating member, spring means for the switch actuating member to travel in one direction to open the switch and de-energize the electric motor, latch means to oppose the travel of the switch actuating member, tripping means responsive to the axial movement of the separating clutch parts to trip the latch means, whereby the switch actuating member travels in said one direction under the action of the spring means to open the switch means.

9. A cutting machine for cutting a stock of material into shorter pieces, comprising, in combination, a cutting tool, an electric motor for driving the cutting tool, switch means for controlling the operation of the motor, mechanical transmitting means driven by the motor for feeding the cutting tool relative to the stock of material, said mechanical transmitting means including a clutch having axially separating disengaging parts, and control means responsive to the axial movement of the clutch parts to open the switch means and de-energize the electric motor.

10. A cutting machine for cutting a stock of material into shorter pieces, comprising, in combination, a cutting tool, an electric motor for driving the cutting tool, switch means for controlling the operation of the motor, mechanical transmitting means driven by the motor for feeding the cutting tool relative to the stock of material, said mechanical transmitting means including a clutch having axially separating disengaging parts, control means responsive to the axial movement of the clutch parts to open the switch means and de-energize the electric motor, and means to delay the opening of the switch means until the feed of the tool reaches a predetermined position.

11. A machine for cutting a stock of material into shorter pieces comprising, in combination, a main drive shaft, a pendulum frame pivotally swingable about the drive shaft, a second shaft carried by the pendulum frame, means for driving the second shaft by the main drive shaft, a cutting tool driven by the second shaft for cutting the stock of material, mechanical transmitting means driven by the main drive shaft for actuating the pendulum frame and thereby feeding the cutting tool relative to the stock of material, said mechanical transmitting means including a clutch, said clutch disengaging under pressure of the tool against the stock obtaining a predetermined value, said clutch re-engaging and feeding the tool against the stock until said predetermined pressure is attained, at which time the clutch is again disengaged, said disengaging and engaging action of the clutch continuing until the pendulum frame reaches a pre-determined position, and means responsive to said predetermined position for arresting the movements of the main drive shaft.

12. A machine for cutting a stock of material into shorter pieces comprising, in combination, a cutting tool for cutting the stock of material, transmitting means for feeding the cutting tool relative to the stock of material, said transmitting means including a clutch, said clutch disengaging under pressure of the tool against the stock obtaining a predetermined value, said clutch re-engaging and feeding the tool against the stock until said predetermined pressure is attained, at which time the clutch is again disengaged, said disengaging and engaging action of the clutch continuing until the feed of the tool reaches a predetermined position, and means responsive to said predetermined position for arresting the cutting action of the tool.

13. A machine for cutting a stock of material into shorter pieces comprising, in combination, a cutting tool for cutting the stock of material, transmitting means for feeding the cutting tool relative to the stock of material, said transmitting means including a clutch, said clutch disengaging under pressure of the tool against the stock obtaining a predetermined value, said clutch re-engaging and feeding the tool against the stock until said predetermined pressure is attained, at which time the clutch is again disengaged, said disengaging and engaging action of the clutch continuing until the feed of the tool reaches a predetermined position.

14. A machine for cutting a stock of material into shorter pieces comprising, in combination, a cutting tool for cutting the stock of material, transmitting means for feeding the cutting tool relative to the stock of material, said transmitting means including a clutch, said clutch disengaging under pressure of the tool against the stock obtaining a predetermined value, said clutch re-engaging and feeding the tool against the stock until said predetermined pressure is attained, at which time the clutch is again disengaged, said disengaging and engaging action of the clutch continuing until the feed of the tool reaches a predetermined position, means responsive to said predetermined position for arresting the cutting action of the tool, and stock injector mechanism responsive to said predetermined position for injecting the stock of material into cutting position for the cutting tool.

15. A machine for cutting a stock of material into shorter pieces comprising in combination, a cutting tool for cutting the stock of material, transmitting means for feeding the cutting tool relative to the stock of material, and stock injector mechanism responsive to the transmitting means for injecting the stock of material into cutting position for the cutting tool, said stock injector mechanism comprising a first clamping device for delivering the stock to the tool and a second clamping device for stationarily holding the stock after it is delivered to the tool, said first clamping device having opposing jaws for engaging the stock, means including reciprocal piston means for clamping the jaws against the stock and delivering the stock to the tool, the second clamping device having jaw means and a fluid device for actuating the jaw means, fluid valve means governed by the movements of the tool for controlling the reciprocal piston means and the fluid device to effect operation of the first and second clamping device, said second clamping device holding the stock stationary during the cutting operation of the tool, said first clamping device upon the finishing of the cutting operation firmly gripping the stock and pushing same while still being held stationary by the second clamping device, said second clamping device subsequently releasing the stock and permitting the first clamping device to inject the stock into cutting position for the cutting tool, after which the second clamping device re-clamps the stock for another cutting operation during which time the first clamping device is retracted to regain another grip on the stock for a subsequent injection.

16. A stock injecting mechanism for delivering stock to a cutting tool, said mechanism comprising a first clamping device for delivering the stock to the tool and a second clamping device for stationarily holding the stock after it is delivered to the tool, said first clamping device having opposing jaws for engaging the stock, said jaws having tapered surface portions diverging in the direction of the delivery of the stock, spaced rollers engaging the tapered surface portions, reciprocal piston means for actuating the rollers against the tapered surface portions, thereby clamping the jaws against the stock and delivering the stock to the tool, opposing means constantly urging the tapered surface portions against said rollers, the second clamping device having jaw means and a fluid device for actuating the jaw means, fluid valve means governed by the movements of the tool for controlling the reciprocal piston means and the fluid device to effect operation of the first and second clamping device, said second clamping device holding the stock stationary during the cutting operation of the tool, said first clamping device upon the finishing of the cutting operation firmly gripping the stock and pushing same while still being held stationary by the second clamping device, said second clamping device subsequently releasing the stock and permitting the first clamping device to inject the stock into cutting position for the cutting tool, after which the second clamping device re-clamps the stock for another cutting operation during which time the first clamping device is retracted to regain another grip on the stock for a subsequent injection.

17. A stock injecting mechanism for delivering stock to a cutting tool, said mechanism comprising a first clamping device for delivering the stock to the tool and a second clamping device for stationarily holding the stock after it is delivered to the tool, said first clamping device having opposing jaws for engaging the stock, said jaws having tapered surface portions diverging in the direction of the delivery of the stock, spaced rollers engaging the tapered surface portions, reciprocal piston means for actuating the rollers against the tapered surface portions, thereby clamping the jaws against the stock and delivering the stock to the tool, opposing fluid means constantly urging the tapered surface portions against said roller, the second clamping device having jaw means and a fluid device for actuating the jaw means, fluid valve means governed by the movements of the tool for controlling the reciprocal piston means and the fluid device to effect operation of the first and second clamping device, said second clamping device holding the stock stationary during the cutting operation of the tool, said first clamping device upon the finishing of the cutting operation firmly gripping the stock and pushing same while still being held stationary by the second clamping device, said second clamping device subsequently releasing the stock and permitting the first clamping device to inject the stock into cutting position for the cutting tool, after which the second clamping device re-clamps the stock for another cutting operation during which time the first clamping device is retracted to regain another grip on the stock for a subsequent injection.

18. The combination with a load and an electric motor to drive the load, and a switch to control the motor, of transmitting means between the load and the motor, said transmitting means including a clutch having axially separating disengaging parts, a switch actuating member, spring means for urging the switch actuating member to travel in one direction to open the switch and deenergize the electric motor, latch means to oppose the travel of the switch actuating member, tripping means responsive to the axial movement of the separating clutch parts to trip the latch means, whereby the switch actuating member travels in said one direction under the action of the spring means, arresting means movable with the load for arresting the travel of the switch actuating member and thereby delaying the opening of the switch means, said switch actuating member continuing its travel and opening the switch means when the arresting means clears the switch actuating member.

19. A stock injecting mechanism for delivering stock to a cutting tool, said mechanism comprising a first clamping device for delivering the stock to the tool and a second clamping device for stationarily holding the stock after it is delivered to the tool, said first clamping device having opposing jaws for engaging the stock, means including reciprocal piston means for clamping the jaws against the stock and delivering the stock to the tool, the second clamping device having jaw means and a fluid device for actuating the jaw means, fluid valve means governed by the movements of the tool for controlling the reciprocal piston means and the fluid device to effect operation of the first and second clamping device, said second clamping device holding the stock stationary during the cutting operation of the tool, said first clamping device upon the finishing of the cutting operation firmly gripping the stock and pushing same while still being held stationary by the second clamping device, said second clamping device subsequently releasing the stock and permitting the first clamping device to inject the stock into cutting position for the cutting tool, after which the second clamping device re-clamps the stock for another cutting operation during which time the first clamping device is retracted to regain another grip on the stock for a subsequent injection.

20. A stock injecting mechanism for delivering stock to a cutting tool, said mechanism comprising a first clamping device for delivering the stock to the tool and a second clamping device for stationarily holding the stock after it is delivered to the tool, said first clamping device having opposing jaws for engaging the stock, said jaws having tapered surface portions diverging in the direction of the delivery of the stock, side contracting means engaging the tapered surface portions, reciprocal piston means for actuating the side contracting means against the tapered surface portions, thereby clamping the jaws against the stock and delivering the stock to the tool, opposing means constantly urging the tapered surface portions against said side contracting means, the second clamping device having jaw means and a fluid device for actuating the jaw means, fluid valve means governed by the movements of the tool for controlling the reciprocal piston means and the fluid device to effect operation of the first and second clamping device, said second clamping device holding the stock stationary during the cutting operation of the tool, said first clamping device upon the finishing of the cutting operation firmly gripping the stock and pushing same while still being said second clamping device subsequently releasing the stock and permitting the first clamping device to inject the stock into cutting position for the cutting tool, after which the second clamping device re-clamps the stock for another cutting operation during which time the first clamping device is retracted to regain another grip on the stock for a subsequent injection.

21. The combination with a load and an electric motor to drive the load, and a switch to control the motor, of transmitting means between the load and the motor, said transmitting means including a clutch having relatively movable parts, a switch actuating member, urging means for urging the switch actuating member to travel in one direction to open the switch and de-energize the electric motor, latch means to oppose the travel of the switch actuating member, tripping means responsive to the relative movements of the clutch parts to trip the latch means, whereby the switch actuating member travels in said one direction under the action of the urging means, arresting means movable with the load for arresting the travel of the switch actuating member and thereby delaying the opening of the switch means, said switch actuating member continuing its travel and opening the switch means when the arresting means clears the switch actuating member.

22. A cutting machine for cutting a stock of material into shorter pieces, comprising in combination, a cutting tool, an electric motor for driving the cutting tool, switch means for controlling the operation of the motor, mechanical transmitting means driven by the motor for feeding the cutting tool relative to the stock of material, said mechanical transmitting means including a clutch having relatively movable parts, control means responsive to the relative movements of the clutch parts to open the switch means and de-energize the electric motor, and means to delay the opening of the switch means until the feed of the tool reaches a predetermined position.

23. A cutting machine for cutting a stock of material into shorter pieces, comprising in combination, a cutting tool, an electric motor for driving the cutting tool, switch means for controlling the operation of the motor, mechanical transmitting means driven by the motor for feeding the cutting tool relative to the stock of material, said mechanical transmitting means including a clutch having relatively movable parts, and control means responsive to the relative movements of the clutch parts to open the switch means and de-energize the electric motor.

HARRY M. MORROW.
VIRGIL O. SHELTON.